Dec. 15, 1959     C. E. SNYDER     2,917,096
TIRE SAFETY WALL
Original Filed March 16, 1949
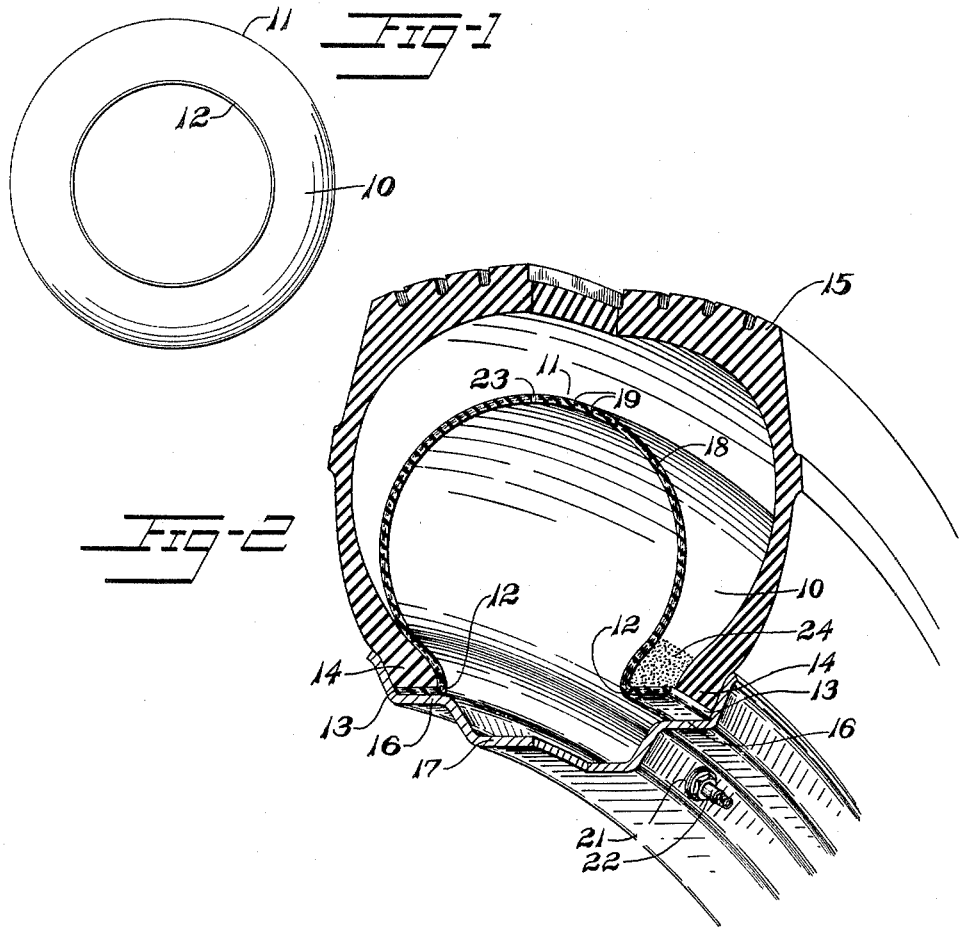
Inventor
Clarence E. Snyder United States Patent Office 2,917,096
Patented Dec. 15, 1959

2,917,096

TIRE SAFETY WALL

Clarence E. Snyder, Akron, Ohio, assignor to The B. F. Goodrich Company, New York, N.Y., a corporation of New York Continuation of application Serial No. 81,731, March 16, 1949. This application February 24, 1958, Serial No. 716,916

13 Claims. (Cl. 152—341)

This invention relates to a tire safety wall for separating the fluid-containing space within the tire into two connecting chambers such that upon rupture of one chamber of the tire the tire will be supported by the fluid in the other chamber and deflation of the tire will be delayed. The invention is especially useful in safety walls for tires constructed to retain air without the use of an inner tube.

This application is a continuation of my copending application S.N. 81,731, filed March 16, 1949, and now abandoned, entitled "Tire Safety Wall," and assigned to The B. F. Goodrich Company.

The desirability of providing a support within a pneumatic tire, to prevent immediate and complete collapse of the tire upon failure of the outer casing, has long been recognized, and structures involving inflated tubes smaller than the internal dimensions of the casing have been proposed for that purpose. Such previously known structures have offered difficulties in preventing displacement of the tubes, especially at high speeds under the influence of centrifugal force when displacement is particularly troublesome because of the resulting unbalance and consequent vibration of the wheel and the vehicle. Also, constructions proposed heretofore have been difficult to mount on the tire rim, and have not always assured effective sealing.

To eliminate the foregoing and other difficulties, this invention provides a flexible yet substantially inextensible safety wall which is mounted in and preferably secured to the tire and is restrained so that no movement can occur which would adversely affect the balance of the tire. When the tire and safety wall assembly is mounted on a rim a continuous pneumatically impenetrable seal is formed between spaced edge portions of the wall and the tire bead portions. An airtight seal is also formed between the tire beads and the rim so that an inner chamber is formed bounded by the safety wall and the rim, and an outer chamber is formed bounded by the safety wall and the tire.

Objects of the invention are to provide a safety wall for retaining supporting fluid within a tire, especially within a tire of the type which does not require an inner tube, to provide means for securing the safety wall to the tire and rim against forces tending to displace the safety wall in the tire, especially at high speeds, to provide an improved fluid seal between the tire and rim, to provide accessibility to the inner faces of the tire casing for making repairs, and to provide for simplicity in construction and for convenience of installation. In the preferred embodiment of the invention means are provided for permitting the controlled passage of air between the chambers, a restricted opening in the safety wall having been found suitable for this purpose.

These and other objects will be apparent from the following description, reference being had to the drawings in which:

Fig. 1 is an elevation of a safety wall constructed in accordance with and embodying the invention.

Fig. 2 is a section in perspective of a tire, rim and safety wall assembly showing a safety wall constructed in accordance with and embodying the invention.

Referring to Figs. 1 and 2 of the drawings, a safety wall 10 is shown which comprises an annular sheet of flexible material preferably impermeable and of resilient rubber or other rubber-like material for retaining a portion of fluid such as air in the tire. The safety wall 10 has a wall portion 11 with an arcuate cross section and is open at the inner circumference, so that wall portion 11 is generally C-shaped in section. The edges 12, 12 of the C-shaped safety wall portion 11 have axially extending retaining flaps 13, 13 which are preferably circumferentially continuous for disposition between the rim engaging faces of bead portions 14, 14 of a tire 15 and abutting rim flanges 16, 16 of a rim 17 as shown in Fig. 2. As also can be seen from Fig. 2, the complete safety wall 10 including wall portion 11 and flaps 13, 13 has a cross-section of the general shape of the Greek capital letter omega. The radially outer circumference of the safety wall has a diameter which is substantially smaller than the crown diameter of the opposing face of the tire 15 to prevent contact of the wall portion 11 with the crown portion of the normally inflated tire. As previously mentioned, in its extended condition the wall portion 11 of the safety wall 10 separates the space in the tire 15 into two chambers with an inner chamber defined by the safety wall portion 11 and the metal wall of the rim 17 and an outer chamber defined by the safety wall portion 11 and the tire. The inner chamber between the safety wall and the rim preferably contains at least 30% by volume of the total space in the tire. It is desirable that the space enclosed by the wall portion 11 of safety wall 10 extends well outward of the rim 17 and that the diameter of the outer circumference of the safety wall be substantially greater than the diameter of the outer circumference of the flanges 16, 16 of the rim 17, so that while supporting air remains within the inner chamber of the safety wall sufficient support will be supplied by the safety wall upon puncture or blowout of the tire to prevent loss of driving control and reduce the danger of the tire being pinched between the rim and the road.

The flaps 13, 13 preferably have a circumference which is substantially the same as the circumference of the rim flanges 16, 16 to provide a smooth close fit of the flaps against the rim.

The safety wall 10 has reinforcing material 18 of suitable material such as cotton, rayon or nylon fabric embedded therein which is substantially inextensible for limiting the stretching and other movement of the wall in the tire 15. The reinforcing material 18 may be applied in plies 19, 19 which extend into flaps 13, 13 providing a strong integral structure.

An aperture 21 is provided in the rim 17 and a valve 22 may be mounted in the aperture in fluid-sealing engagement for transmitting fluid such as air into the inner chamber formed by the safety wall 10 and rim 17. In the preferred embodiment of the invention a restricted opening 23 is provided in the outer wall portion 11 of the safety wall 10 for permitting controlled passage of air from the inner chamber defined by wall portion 11 of the safety wall and the rim 17 to the outer chamber defined by safety wall portion 11 and the tire 15. The restricted opening facilitates inflation of the outer chamber by means of valve 22 and yet it is small enough to prevent rapid escape of air from the inner chamber defined by the safety wall and the rim upon rupture of the tire. It is desirable that the opening 23 have a smaller crosssectional area than that of the orifice of the valve 22. It has been found that by using an opening 23 which is one-half the size of the orifice of the valve 22, satisfactory operation will be obtained.

The edges 12, 12 of the safety wall 10 are preferably adhesively anchored to the bead portions 14, 14 or to the inner peripheral wall portion of the tire or to both as by a suitable cement 24 or by vulcanization to facilitate mounting of the tire 15 and safety wall on the rim 17. The adhesive connection is desirable but is not absolutely necessary for effective operation of the safety wall 10 and need not have great strength. In fact, it is desirable that the safety wall 10 may be removed from the tire casing 15 without damaging the tire or safety wall in order that repairs may be easily made to the inner faces of the tire casing.

In mounting and demounting a tire on a rim and especially a drop center rim such as the rim 17 shown in Fig. 2 it is necessary to spread the bead portions 14, 14 apart, and also to have sufficient lateral freedom of the bead portions to make possible movement of the bead portions into the central channel of the rim. It is also desirable that the bead portions may be spread apart during shipment and storage of the tire.

With the construction of this invention the safety wall 10, even when mounted in the tire, allows ample lateral movement of the bead portions 14, 14 and permits convenient mounting, demounting and storage of the tire 15.

The safety wall 10 is installed with the flaps 13, 13 between the bead portions 14, 14 of the tire and the rim flanges 16, 16 of the rim 17. In this position the flaps 13, 13 are gripped firmly and hold the safety wall 10 in place. The flaps 13, 13 may be compressed between the tire 15 and rim 17 to form a tight fluid seal to prevent the escape of air at the bead portions 14, 14. For further assurance of sealing against leakage past the bead portions of the tire, additional sealing means may be provided, if desired, such for example as a layer of soft rubber or other sealing device at the outer faces of the bead portions between the latter and the rim flanges. The tire casing 15 may be of any suitable construction for retaining air, including a material at its inner face for resisting the diffusion of air through it. The body of the tire may comprise the usual reinforcing cord material extending in its walls to metallic beads in the bead portions 14, all embedded in the rubber of the body.

The tire 15 may be inflated by injecting air into the inner chamber defined by the safety wall and rim through the valve 22. The restricted opening 23 in the safety wall transmits air to the outer chamber bounded by the safety wall and the tire casing and in the fully inflated condition of the tire air pressure at all points within the tire and safety wall will be the same because of the provision for controlled passage of air between the chambers.

When the tire 15 is ruptured and the air is suddenly exhausted from the outer chamber of the tire and safety wall assembly, the air within the inner chamber formed by safety wall 10 and the rim supports the tire and prevents loss of control of the vehicle. The air within the inner chamber of the safety wall 10 is permitted to escape gradually through the restricted opening 23, and the rim 17 is slowly lowered to the ground, the restricted nature of the opening 23 delaying the time of total deflation for a sufficient interval to permit safe stopping of the vehicle and prevent damage to the tire.

Variations may be made without departing from the scope of the invention as it is defined in the following claims.

I claim:

1. In combination, an annular wheel rim, a tire mounted on flanges of said rim and a tire safety wall interposed between said tire and the rim flanges, said tire comprising a tread portion and sidewalls terminating in bead portions seating on said flanges and disposed in spaced-apart relation to expose the interior of the tire to the rim, said safety wall comprising an annular body of flexible substantially inextensible sheet material having retaining flaps extending in the axial direction for disposition between the rim and the bead portions in conforming relation to the radially innermost faces of the bead portions of the tire, the sheet material of said body between said flaps extending radially outward therefrom and having a radially outer circumference of substantially greater diameter than the rim flanges but less than the crown diameter of the tire to provide inflation spaces outwardly of said safety wall and inwardly thereof, said safety wall having a restricted opening in the sheet material providing communication between said inflation spaces for equalizing the fluid pressure on both sides of said safety wall, and means for inflating said inflation spaces.

2. In combination, an annular wheel rim, a tire mounted on flanges of said rim and a tire safety wall interposed between said tire and the rim flanges, said tire comprising a tread portion and sidewalls terminating in bead portions seating on said flanges and disposed in spaced-apart relation to expose the interior of the tire to the rim, said safety wall comprising an annular body of flexible sheet material having retaining flaps extending in the axial direction for disposition between the rim and the bead portions in conforming relation to the radially innermost faces of the bead portions of the tire, the sheet material of said body between said flaps extending radially outward therefrom and having a radially outer circumference of substantially greater diameter than the rim flanges but less than the crown diameter of the tire to provide inflation spaces outwardly of said safety wall and inwardly thereof, the sheet material of said body comprising a fabric reinforcement therein extending from flap to flap and terminating in its radially innermost extent at said flaps, said safety wall having a restricted opening in the sheet material providing communication between said inflation spaces for equalizing the fluid pressure on both sides of said safety wall, and means for inflating said inflation spaces.

3. In combination, a annular wheel rim, a tire mounted on flanges of said rim and a tire safety wall interposed between said tire and the rim flanges, said tire comprising a tread portion and sidewalls terminating in bead portions seating on said flanges and disposed in spaced-apart relation to expose the interior of the tire to the rim, said safety wall comprising a substantially inextensible annular body of flexible sheet material having retaining flaps extending in the axial direction for disposition between the rim and bead portions in conforming relation to the radially innermost faces of the bead portions of the tire, the sheet material of said body between said flaps extending radially outward therefrom and having a radially outer circumference of substantially greater diameter than the rim flanges but less than the crown diameter of the tire to provide with the tire an inflation space outwardly of said safety wall and said safety wall being open at the inner periphery to provide with the rim an inflation space inwardly of said safety wall, and having a restricted opening in the sheet material providing communication between said inflation spaces for equalizing the pressure on both sides of said safety wall, and means for inflating said inflation spaces.

4. A pneumatic safety tire and rim assembly comprising a flanged rim, a tubeless tire comprising a tread portion, and sidewalls terminating in spaced-apart bead portions seating on said rim, a safety wall comprising a substantially inextensible annular body of flexible sheet material having spaced-apart portions mounted on the tire in the region of the bead portions of the tire and said annular body having an outer diameter greater than the outermost diameter of the rim flanges but less than the diameter of the inner face of the crown of the tire to provide inflation spaces outwardly of said safety wall and inwardly thereof, a restricted opening in said annular body providing communication between said inflation spaces for equalizing the fluid pressure on both sides of said safety wall and providing a passage through which the inflation space outwardly of said safety wall may be inflated, means for inflating the space between said rim and said safety wall and said annular body being open at its inner periphery between its said spaced-apart portions with the space within said safety wall exposed directly to said rim.

5. A pneumatic tire and safety wall assembly for mounting on a flanged rim comprising a tubeless tire having a tread portion and sidewalls terminating in spaced-apart bead portions for seating on the rim and a safety wall comprising an annular body of flexible stretch resistant sheet material having an outer diameter greater than the outermost diameter of the rim flanges but less than the diameter of the inner face of the crown of the tire to provide inflation spaces outwardly of said safety wall and inwardly thereof, said safety wall having a restricted opening in said sheet material providing communication between said inflation spaces for equalizing the fluid pressure on both sides of said safety wall, said annular body having spaced-apart portions mounted in the region of the bead portions of the tire and said annular body being open at its inner periphery between its said spaced-apart portions so that when the tire is seated on the rim the space within said safety wall is exposed directly to the rim.

6. A pneumatic tire and safety wall assembly for mounting on a flanged rim comprising a tubeless tire having a tread portion and sidewalls terminating in spaced-apart bead portions for seating on the rim and a safety wall comprising an annular body of flexible sheet rubber material having an outer diameter greater than the outermost diameter of the rim flanges but less than the diameter of the inner face of the crown of the tire to provide inflation spaces outwardly of said safety wall and inwardly thereof, said annular body having spaced-apart portions mounted on the tire in the region of the bead portions of the tire, the sheet material of said annular body comprising a stretch-resisting reinforcement therein extending between its said spaced-apart portions, a restricted opening in said annular body providing communication between said inflation spaces for equalizing the fluid pressure on both sides of said safety wall and providing a passage through which the inflation space outwardly of said safety wall may be inflated, and said annular body being open at its inner periphery between its said spaced-apart portions so that when the tire is seated on the rim the space within said safety wall is exposed directly to the rim.

7. A tire and safety wall assembly for mounting on flanges of a tire rim, said tire comprising a tread portion and sidewalls terminating in bead portions having faces for seating on said rim flanges which faces constitute the radially innermost surfaces of the tire, said safety wall comprising an annular body of flexible sheet material having retaining flaps extending in the axial direction and anchored to said bead portions in conforming relation against the radially innermost faces of the bead portions, the sheet material of said safety wall between said flaps extending radially outward therefrom and having a radially outer circumference of substantially greater diameter than the rim flanges but less than the crown diameter of the tire to provide inflation spaces outwardly of said safety wall and inwardly thereof, the sheet material of said body being substantially inextensible from flap to flap, and said safety wall being open between said flaps for exposure of the space within said safety wall to the rim and having a restricted opening in the sheet material providing communication between said inflation spaces for equalizing the fluid pressure on both sides of said safety wall.

8. For use with a solid wheel rim having a valve mounted therein in air tight relation therewith to permit the controlled passage of air therethrough, a pneumatic tire having casing structure comprising an annular pneumatically impenetrable outer casing having axially spaced annular bead portions; an inextensible flexible annular wall of C-shape cross section mounted within said casing and terminating adjacent each of said bead portions in axially spaced annular peripheral edges; a continuous pneumatically impenetrable seal between the spaced edge regions of said wall and the bead portions of said outer casing and supporting the annular portion of said wall intermediate said edge regions in spaced relation from the interior surface of said outer casing to define an outer air chamber between said wall and the interior of said casing of crescent-like cross section and an annular channel adapted to be closed by a rim to form an inner air chamber, means in said wall to permit the controlled passage of air therethrough from the inner to the outer air chamber, and means for forming an air tight seal between said bead portions and the spaced edge region of such a wheel rim.

9. In combination, a pneumatic tire and a rim, the casing structure of said tire comprising a pneumatically impenetrable outer casing provided peripherally on the exterior surface thereof with a ground engaging tread and having axially spaced annular bead portions; a continuous pneumatically impenetrable seal between said rim and each of said bead portions; a relatively thin, annular, flexible, inextensible inner casing mounted within said outer casing and terminating in axially spaced peripheral edges; means for supporting said inner casing at the spaced edge regions thereof in air tight relation with said outer casing adjacent the bead portions thereof so that the wall of said inner casing and the surface of said rim define an inner air chamber and the adjacent surfaces of said inner and outer casings define an outer air chamber; valve means in said rim for permitting the introduction of air directly into said inner air chamber, and means in said wall for permitting the controlled passage of air therethrough between said chambers.

10. In combination, a wheel rim, a pneumatic tire mounted on said rim, said tire including an annular pneumatically impenetrable casing having axially spaced annular bead portions, said bead portions being mounted in air-sealing relation on said rim, a substantially inextensible flexible annular safety member having a wall of C-shape cross section disposed within said casing, said safety member having retaining means at its inner peripheral portions preventing radial dislodgement under radial force, the inner peripheral portions of said safety member forming a continuous pneumatically impenetrable seal with the bead portions of said tire casing, said C-shaped wall intermediate its inner peripheral portions being spaced from the interior surface of said tire casing to define an outer air chamber between said C-shaped wall and said tire casing of crescent-like cross section, and to define an inner air chamber closed by said rim, and means in said wall to provide restricted passage of air from said inner air chamber to said outer air chamber.

11. A safety diaphragm for use in combination with an open-bellied tire and rim assembly of the type comprising a tire having beaded edges, an air-tight rim having tire bead receiving seats and outwardly extending tire retaining flanges at the outer edges of said bead receiving seats, and an inflation valve in the rim, said safety diaphragm comprising an outwardly bowed annular portion of substantially inextensible sheet material for spanning the space between the beaded edges of the tire and having axial retaining flaps capable of being disposed between and gripped by the bead receiving seats of the rim and the beaded edges of the tire, said outwardly bowed annular portion of the diaphragm having its greatest diameter substantially greater than that of the tire retaining rim flanges but less than that of the crown of the tire so as to separate the chamber formed by the tire and rim assembly into inner and outer inflation spaces and being capable of sustaining the wheel load upon deflation of the outer inflation space, and a restricted opening in said outwardly bowed portion of said diaphragm for providing communication between said inner and outer inflation spaces.

12. A tubeless tire adapted to be mounted on a rigid air-impermeable rim provided with bead seats and tire retaining side flanges, said tire comprising a U-shaped casing for encircling said rim and having sidewalls terminating in beads, and a safety diaphragm of smaller cross-section than that of the tire capable of being interposed between said casing and said rim to define an outer inflatable chamber in the space encompassed by said casing and said safety diaphragm and an inner inflatable chamber in the space encompassed by said safety diaphragm and said rim; said safety diaphragm being formed of relatively thin flexible substantially inextensible material of strength and durability for limited service as an inner pneumatic tire upon complete deflation of said outer chamber and having a cross-section which is generally arcuate with its convex side extending well beyond the height of the rim flanges and with outwardly turned flaps adapted to be firmly gripped between the respective beads of said casing and the bead seats of said rim to provide a tight air seal.

13. A tubeless tire adapted to be mounted on a rigid air-impermeable rim provided with bead seats and tire retaining side flanges, said tire comprising a U-shaped casing for encircling said rim and having sidewalls terminating in beads, and a safety diaphragm of smaller cross-section than that of the tire capable of being interposed between said casing and said rim to define an outer inflatable chamber in the space encompassed by said casing and said safety diaphragm and an inner inflatable chamber in the space encompassed by said safety diaphragm and said rim; said safety diaphragm being formed of relatively thin flexible substantially inextensible material of strength and durability for limited service as an inner pneumatic tire upon complete deflation of said outer chamber and having a cross-section which is generally arcuate with its convex side extending well beyond the height of the rim flanges and with outwardly turned flaps adapted to be removably seated and firmly gripped between the respective beads of said casing and the bead seats of said rim to provide a tight air seal.

References Cited in the file of this patent

UNITED STATES PATENTS

| | | |
|---|---|---|
| 1,295,604 | Roberts | Feb. 25, 1919 |
| 1,653,054 | Mack | Dec. 20, 1927 |
| 2,811,189 | Howard | Oct. 29, 1957 |